United States Patent [19]

Oliver

[11] 3,729,015
[45] Apr. 24, 1973

[54] VALVE WITH SEAT ROTATING MEANS
[75] Inventor: John P. Oliver, Houston, Tex.
[73] Assignee: Cameron Iron Works, Inc., Houston, Tex.
[22] Filed: Dec. 29, 1971
[21] Appl. No.: 213,410

[52] U.S. Cl. .................................. 137/330, 251/315
[51] Int. Cl. ............................................. F16k 29/00
[58] Field of Search ..................... 137/330, 331, 333, 137/242, 243, 243.6; 251/161, 188

[56] References Cited

UNITED STATES PATENTS

| 1,770,900 | 7/1930 | Dawson | 137/243.6 |
| 2,977,975 | 4/1961 | Allen | 137/330 |
| 3,157,190 | 11/1964 | Allen | 137/330 |
| 3,378,026 | 4/1968 | Oliver | 137/330 |

Primary Examiner—Martin P. Schwadron
Assistant Examiner—Richard Gerard
Attorney—W. F. Hyer et al.

[57] ABSTRACT

A valve having a seat which is caused to rotate about its axis between different rotational positions by power means which is independent of the power means by which the closure member is moved between opened and closed positions. Operation of the power means for rotating the seat may be initiated by means automatically responsive to movement of the closure member into a predetermined position or by means independent of movement of the closure member.

11 Claims, 5 Drawing Figures

Patented April 24, 1973
3,729,015
2 Sheets-Sheet 1
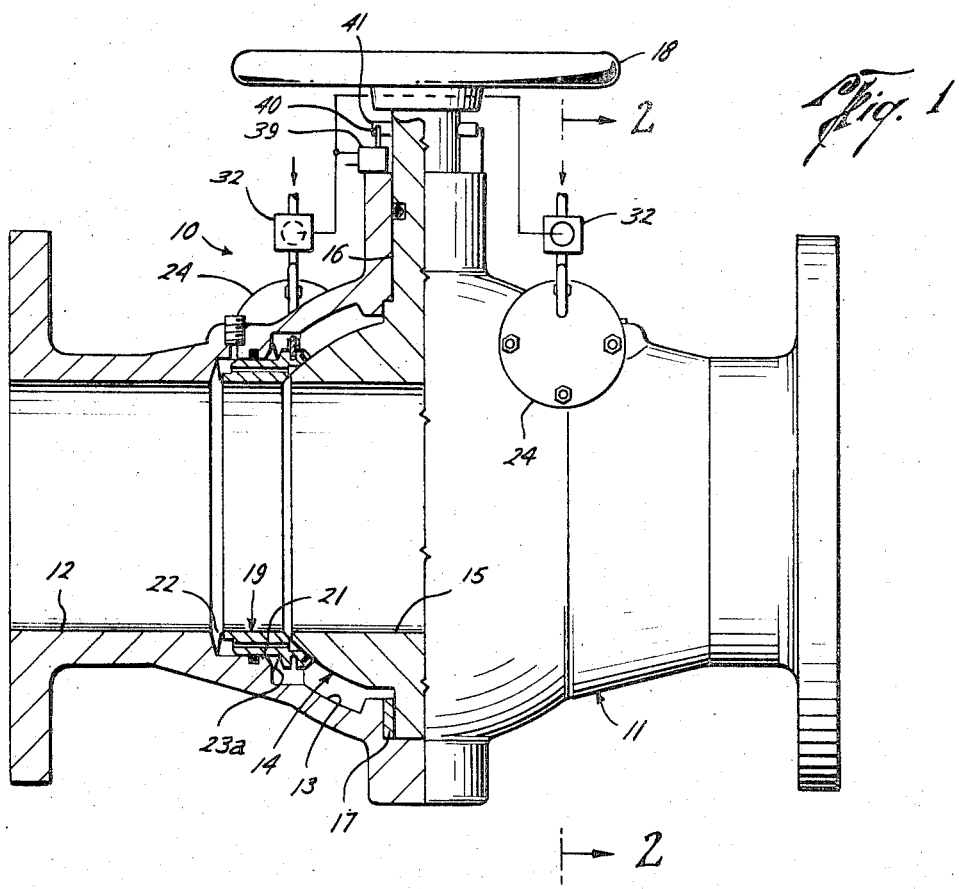
Fig. 1
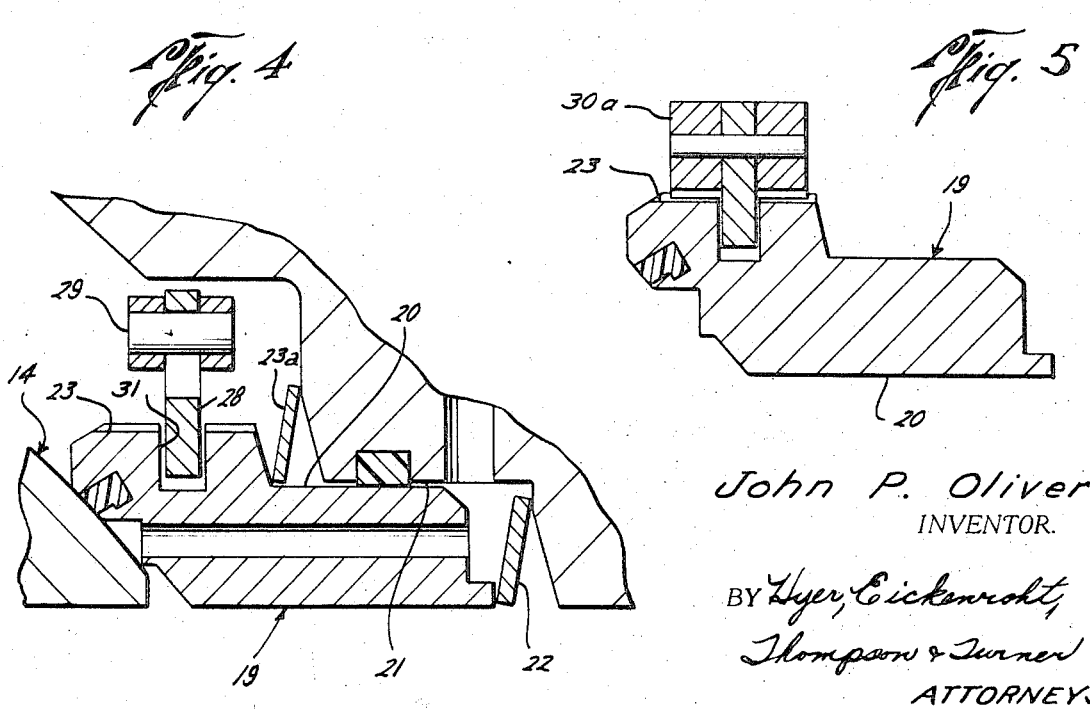
Fig. 4
Fig. 5
John P. Oliver
INVENTOR.
BY Hyer, Eickenroht,
Thompson & Turner
ATTORNEYS

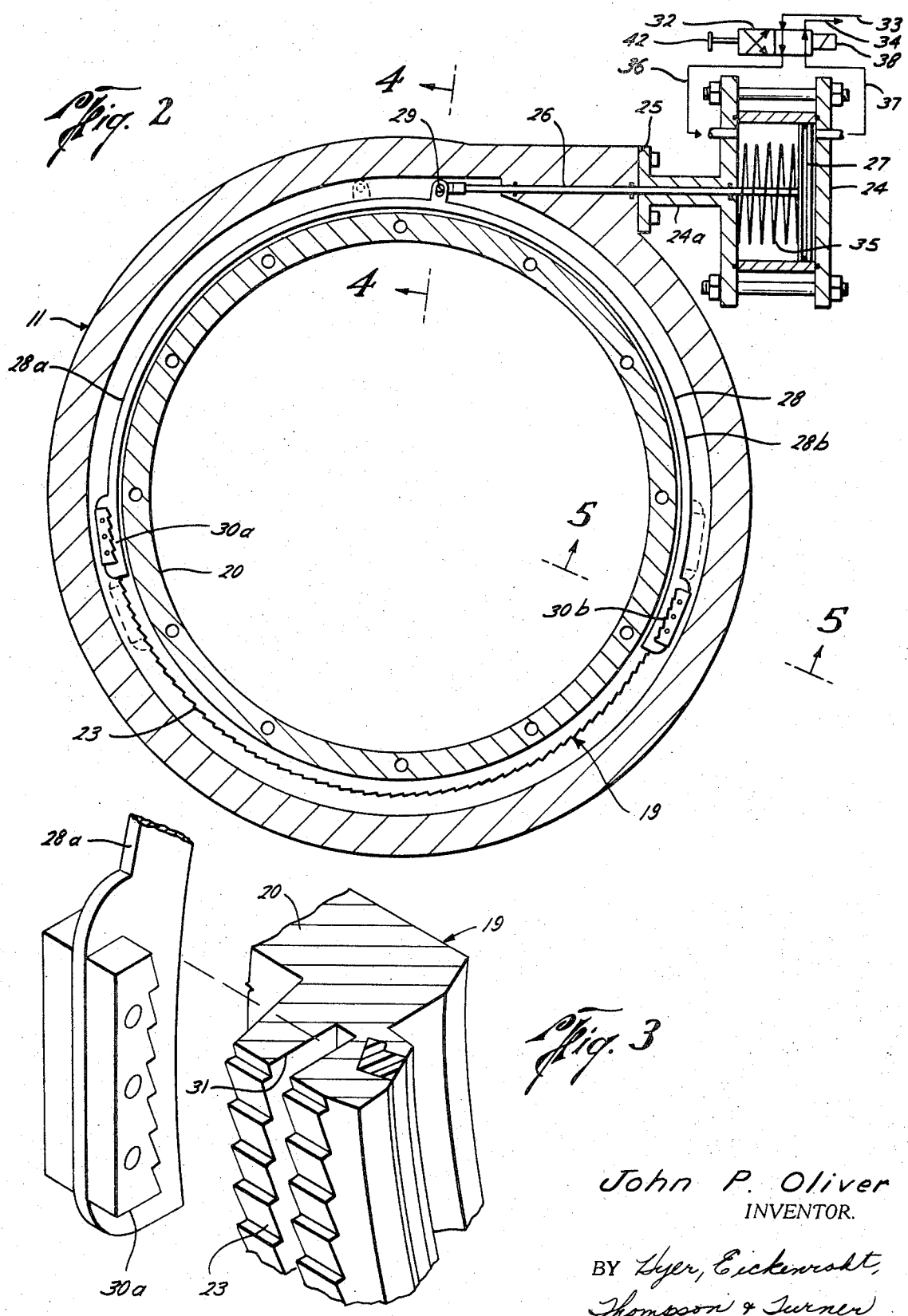

VALVE WITH SEAT ROTATING MEANS

This invention relates to improvements in valves of the type having one or more seats which are caused to rotate about their axes between different rotational positions automatically in response to operation of the valve.

The primary purpose of valves of this type, such as those shown in U.S. Pat. Nos. 2,977,976 and 3,157,190, is to distribute wear about the seats, which ordinarily occurs at the inner peripheral portion of the seat over which the closure member of the valve is last to slide. Periodic rotation of the seats also serves to reduce the likelihood of their becoming stuck and to disperse sealant between their seating surfaces and adjacent surfaces of the closure member.

In the valves of these prior patents, each seat is caused to rotate by a part on the closure member which drivingly engages the seat during movement of the closure member between opened and closed positions. Thus, during such movement to one position, the driving part on the closure member, which may be a dog pivotally mounted thereon, engages and follows a driven part on the seat, which may be one of a circle of teeth on its periphery to rotate the seat a desired angular distance. Then, during movement of the closure member back to its original position, the dog is free to pivot out of driving engagement with the teeth, so that the seat is not caused to rotate back to its original position.

In the case of downstream sealing valves, these driving parts are ordinarily arranged on the closure member to engage the seat when the valve is almost fully open, and thus either near the start of the closing movement or the end of the opening movement of the closure member. During this stage, there is considerably less resistance to turning of the seat, and thus less power required to operate the valve than would be required were the seat to be rotated when the valve was closed. In the case of upstream sealing valves, this engagement ordinarily occurs when the valve is closed.

However, some rotary operators for valves have maximum torque outputs during the middle of their operation, in which case it would be desirable to rotate the seat during this stage of operation. Also, the power required to rotate a seat is relatively high as compared to that required to cause the valve closure member to break away, so that the output of operators having sufficient capacity to rotate the seat as well as closure member, may be so large as to damage the stem on the closure member in the event movement of the closure member is blocked by an obstruction in the valve itself. Furthermore, in the event the seat is stuck, the closure member is immobilized, and, conversely, in the event the closure member cannot be moved, the seat cannot be rotated. Still further, there are instances in which it may be desirable to rotate the seat without opening or closing the valve such as, for example, to prevent the seat from becoming stuck or to distribute sealant about it.

Also, in prior ball valves of this type, the dogs and teeth on the seats have been so arranged and constructed as to cause the dogs to impart a force to the seat which has a component acting in a direction away from the closure member. As a result, there has been a tendency to separate the seat from the closure member, thereby causing the seat to cock out of its normal position parallel to the axis of rotation of the closure member.

An object of this invention is to provide a valve of this type which obviates the above-described danger of damaging the stem or other parts due to excessive power in the operator.

Another object is to provide such a valve in which each seat may, if desired, be rotated without opening or closing the valve.

Yet another object is to provide a valve of this type in which the timing of seat rotation may be, but need not necessarily be, governed by the output of the operator for the valve or the opening or closing operation of the valve.

Still another object is to provide such a valve in which the closure member may be moved even though the seat is stuck, and, conversely, the seat may be rotated even though the closure member may not be moved.

A further object is to provide such a valve of simple and inexpensive construction in which the seat may be rotated at any desired interval of valve operation.

A still further object is to provide a ball valve of this type in which the seat rotating mechanism is so arranged and constructed that it does not tend to move the seat away from the closure member.

These and other objects are accomplished, in accordance with the illustrated embodiment of this invention, by a valve having power means for rotating the seat about its axis between different rotational positions independently of the power means for moving the closure member, and means for initiating operation of the power means for so rotating the seat automatically in response to movement of the closure member into a predetermined position. In this manner, the output of the operator for the closure member need be no greater than the power required for moving it. Also, the closure member is not immobilized by inability to rotate the seat, and seat rotation is not prevented by inability to move the closure member. Still further, the means for so initiating operation of the seat rotating power means is arranged to cause the seat to rotate while the valve is substantially open, and thereby reduce its power requirements to a minimum without reducing the overall efficiency of the valve, regardless of the output characteristics of the operator for the closure member.

More particularly, the valve also includes means by which the operation of the seat rotating power means may be initiated independently of movement of said closure member. Consequently, the seat may be rotated at any desired interval of valve operation, such as while the closure member is in closed position.

In the illustrated embodiment of the invention, the seat rotating power means comprises an actuator mounted on the valve body and having a part carried by a rod reciprocably mounted with respect to the body for engaging the seat to rotate it about its axis. Preferably, the means for reciprocating the rod, which may be a cylinder and piston, is mounted on the outside of the valve body, and the rod extends guidably through the body to connect the piston with the part for engaging the seat. More particularly, the rod reciprocates in a path perpendicular to the axis of the opening through the seat, so that the force it imparts to the seat has no component in a direction away from the closure member, and consequently there is no tendency to cock the seat.

In the drawings, wherein like reference characters are used throughout to designate like parts:

FIG. 1 is a side view of the valve, partially in vertical section, and with the closure member in open position;

FIG. 2 is an enlarged cross-sectional view of the valve, as seen along broken line 2—2 of FIG. 1, and indicating in solid and broken lines the positions of the means for rotating the seat prior to and upon actuation of the power means therefor, respectively;

FIG. 3 is an exploded perspective view of the seat shown in FIG. 2, and an end portion of the part for engaging the seat;

FIG. 4 is an enlarged cross-sectional view of a mid portion of the seat rotating part and its connection to the reciprocable rod of the power means, as seen along broken line 4—4 of FIG. 2; and FIG. 5 is an enlarged cross-sectional view of the seat and end portion of the seat rotating part, as seen along broken line 5—5 of FIG. 2.

With reference now to the details of the abovedescribed drawings, the over-all valve shown in FIG. 1 and designated in its entirety by reference character 10, includes a valve body 11 having a flowway 12 therethrough with an enlarged chamber 13 intermediate its opposite ends. A ball closure 14 mounted within the chamber has a port 15 therethrough and upper and lower stems 16 and 17 which are rotatably mounted within the upper and lower ends of the valve chamber to permit the port to be rotated 90° between an open position aligned with the flowway 12, as shown in FIG. 1, and a closed position in which the port is disposed transversely of the flowway. The upper stem 16 extends through the valve body for connection with a handwheel 18 which may be powered by hand or with any other well known type of operator.

An annular seat 19 is mounted within the flowway 12 on each side of the ball closure 14 for sealing between the valve body and the ball closure. As shown in the drawings, this seat comprises a ring 20 sealably slidable within a radially enlarged portion 21 of the flowway at each side of the valve body chamber 13. Each ring is yieldably urged into sealing engagement with the closure member by means of washer-type springs 22 and 23a, and has teeth 23 about its periphery which are engaged by an actuator to cause the seat to rotate about its axis between different rotational positions.

The actuator for each seat includes power means comprising a cylinder 24 mounted on a side of the valve body with its axis extending in a plane perpendicular to the axis of the flowway 12 through the valve body and substantially tangent to the circle of teeth 23 formed about the seat. As shown in FIG. 1, the cylinders are mounted on opposite sides and at the upper portion of the valve body and have tubular extensions bolted to abutments 25 on the sides of the valve body. As also shown in FIG. 2, a piston 27 sealably reciprocable within each cylinder 24 has a rod 26 which extends guidably through the tubular extension 24a and valve body abutment 25 so as to dispose its inner end within the valve body near the upper periphery of the seat to be rotated.

As shown in FIG. 2, a U-shaped element or wishbone 28 is carried on the inner end of each rod 26 for engaging teeth 23 on opposite sides of the seat 19 to be rotated. The upper mid portion of the wishbone is loosely connected to a pin 29 on the end of the rod 26, and arms 28a and 28b on opposite sides of the wishbone are sprung to tightly engage opposite sides of teeth 23.

More particularly, there are teeth on the ends of the arms which cooperate with the teeth about the seat so that upon reciprocation of the rod by the power means from the solid line position to the dotted line position and then back to the solid line position of FIG. 2, the seat is rotated about its axis and through a predetermined angle. For this purpose, the seat teeth 23 are provided with abrupt shoulders which face in a clockwise direction, as shown in FIG. 2, and gradually tapered surfaces on the back sides of the shoulders, as also shown in FIG. 2. The ends of the arms 28a and 28b are in turn provided with ratchets 30a and 30b, respectively, having teeth of the same size as the teeth 23, but facing in the opposite direction. Thus, when the rod 26 moves to the left, the ratchets 30a and 30b will rotate the seat in a counterclockwise direction, and, when the rod returns, the ratchets 30a and 30b will merely slide over the back sides of the teeth 23 about the seat without causing rotation of the seat, whereby the seat is left in a position to which it was rotated.

As shown in each of FIGS. 3, 4 and 5, there is a groove 31 about the periphery of each seat intermediate opposite sides of the teeth 23 thereabout. As also shown in these Figures, each of the ratchets 30a and 30b comprises ratchet halves secured to opposite sides of the end of the arm of the wishbone on which it's mounted. More particularly, the teeth on the ratchet halves are spaced from the inner edge of the end of the arm so as to permit the inner edge to be disposed within the groove 31 about the seat. As will be appreciated this will maintain the wishbone in the proper position laterally of the seat, and thus maintain the ratchet teeth in engagement with the teeth 23 about the seat.

Power fluid is selectively introduced to and exhausted from opposite sides of the piston 27 by means of a pilot valve 32 mounted above the cylinder 24. Power fluid is supplied to the pilot valve through a line 33 and exhausted therefrom through a line 34. As shown diagrammatically in FIG. 2, the pilot valve has ports therein which normally connect the supply conduit 33 with a conduit 36 connecting with the rod side of the piston 27, and a conduit 37 leading from the piston side of the piston 27 to the exhaust conduit 34, so as to maintain the piston in retracted position.

Upon movement of the pilot valve to the right, additional ports therein will introduce power fluid from supply line 33 to the piston side of piston 27, and exhaust power fluid from the rod side thereof to exhaust line 34 so as to extend the rod 26 and thus cause the wishbone 28 to be moved in a counterclockwise direction from its solid line to its dotted line position shown in FIG. 2. Then, of course, upon return movement of the pilot to the left, a spring 35 supplements the force due to the power fluid to move the piston back to the right to force power fluid from the cylinder and withdraw the rod 26 so as to move wishbone 28 clockwise to the solid line position of FIG. 2.

The pilot valve 32 is caused to move to the right in response to actuation of a solenoid 38 carried on its right end. Each solenoid is in turn connected by electrical conduits to a limit switch 39 which, as shown in FIG. 1, is fixedly mounted on the valve body adjacent the outer end of the upper stem 16 of the ball closure. More particularly, the switch 39 has a part 40 extending therefrom and into a position in which it is engaged by a pin 41 on the stem 16 as the ball closure moves near to the open position of FIG. 1. After pin 41 moves past the switch part 40, the solenoid is deactivated and the pilot valve moves back to the left due to a spring bias (not shown).

Thus, as previously described, this power means rotates the seat independently of the power means for rotating the stem, and, for reasons previously discussed, is arranged to be activated as the ball closure moves into open position. However, it will be obvious that the positions of one or both of the pin and switch may be changed so as to in turn change the sequence of seat rotation and closure movement.

As will be apparent from FIG. 1, the switch part 40 is so positioned that it may be manually engaged so as to activate the power means for rotating the seat at any desired interval of valve operation. Also, the pilot valve 32 has a manual override 42 to perform this same function independently of the electrical system. Thus, and again as previously described, the seat may be caused to rotate when the valve is closed, or during any intermediate position of the ball closure 14.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a flowway therethrough, a closure member within the body and movable by power means between positions opening and closing the flowway, a seat mounted within the flowway for engaging a side of the closure member, power means for rotating the seat about its axis and between different rotational positions independently of the power means for moving the closure member, and means for initiating operation of the seat rotating power means automatically in response to movement of said closure member into a predetermined position.

2. A valve of the character defined in claim 1, including means by which operation of said seat rotating power means may be initiated independently of movement of said closure member.

3. A valve, comprising a body having a flowway therethrough, a closure member within the body and movable by power means between positions opening and closing the flowway, a seat mounted within the flowway for engaging a side of the closure member, an actuator having a part engageable with the seat for rotating it about its axis and between different rotational positions independently of the power means for moving the closure member, and means automatically responsive to movement of said closure member into a predetermined position for activating said actuator to cause it to so rotate the seat.

4. A valve of the character defined in claim 3, including means by which said actuator may be activated independently of movement of said closure member.

5. A valve of the character defined in claim 3, wherein said actuator is mounted on the valve body and said part is movable with respect to said body for so engaging the seat.

6. A valve, comprising a body having a flowway therethrough, a closure member within the body and movable by power means between positions opening and closing the flowway, a seat mounted within the flowway for engaging a side of the closure member, a rod mounted on the body for reciprocation with respect thereto and having a part thereon engageable with the seat, during such reciprocation, to rotate said seat about its axis and between different rotational positions, means for reciprocating the rod and thereby rotating the seat independently of the power means for moving the closure member, and means for initiating operation of the rod reciprocating means automatically in response to movement of the closure member to a predetermined position.

7. A valve of the character defined in claim 6, including means by which operation of the rod reciprocating means may be initiated independently of movement of said closure member.

8. A valve of the character defined in claim 7, wherein the rod extends through the valve body, and the means for reciprocating the rod is mounted on the outside of the body.

9. A valve of the character defined in claim 7, wherein said means for reciprocating the rod includes a cylinder fixed to the body, and a piston in the cylinder and connected to the rod.

10. A valve of the character defined in claim 9, wherein the cylinder is mounted on the outside of the valve body and the rod extends through said body.

11. A valve of the character defined in claim 6, wherein the closure member is ball shaped, and the rod reciprocates in a direction perpendicular to the axis of the opening through the seat.

* * * * *